United States Patent [19]

Konishi et al.

[11] Patent Number: 4,593,407
[45] Date of Patent: Jun. 3, 1986

[54] PATTERN PROCESSING SYSTEM

[75] Inventors: Akira Konishi, Fujisawa; Shigeru Matsuura, Chigasaki, both of Japan

[73] Assignee: International Business Machines Corporation, Armonk, N.Y.

[21] Appl. No.: 653,271

[22] Filed: Sep. 21, 1984

[30] Foreign Application Priority Data

Sep. 30, 1983 [JP] Japan .................... 58-180856

[51] Int. Cl.⁴ .................................. G06K 9/32
[52] U.S. Cl. .......................... 382/46; 340/727; 364/900
[58] Field of Search ............ 382/46, 44; 358/22, 358/140; 340/727; 364/731, 900 MS File

[56] References Cited

U.S. PATENT DOCUMENTS

| | | | |
|---|---|---|---|
| 4,168,488 | 9/1979 | Evans | 340/727 |
| 4,271,476 | 6/1981 | Lotspiech | 358/140 |
| 4,300,206 | 11/1981 | Belleson et al. | 364/900 |
| 4,312,045 | 1/1982 | Jean et al. | 340/727 |
| 4,545,069 | 10/1985 | Kermisch | 382/46 |

OTHER PUBLICATIONS

Hill et al., *Digital Systems: Hardware Organization and Design*, 2nd edition, John Wiley & Sons, New York, 1978, pp. 192–200.

Primary Examiner—Leo H. Boudreau
Assistant Examiner—Joseph Mancuso
Attorney, Agent, or Firm—R. Bruce Brodie

[57] ABSTRACT

A pattern storage processing system for use with a page printer has a pattern storage for storing dot matrix patterns representing various characters, etc. Each pattern comprises plural portions called "squares", each of which consists of n×n bits. A selected pattern is transferred square by square from the pattern storage to a raster buffer via a rotator which rotates each square according to orientation information. Successive storage locations in the raster buffer which are to receive successive squares are designated by the combination of a base address in a register and offsets in an offset table.

1 Claim, 10 Drawing Figures

| ADDRESS | SQUARE | BIT IN SQUARE | | | |
|---|---|---|---|---|---|
| | | 3 | 2 | 1 | 0 |
| K + 1 | $S_{11}$ | 0 | 0 | 0 | 0 |
| K + 2 | $S_{12}$ | 0 | 1 | 1 | 0 |
| K + 3 | $S_{13}$ | 1 | 0 | 0 | 1 |
| K + 4 | $S_{14}$ | 0 | 0 | 0 | 0 |
| K + 5 | $S_{21}$ | 0 | 0 | 0 | 1 |
| K + 6 | $S_{22}$ | 1 | 0 | 0 | 0 |
| K + 16 | $S_{44}$ | 1 | 0 | 1 | 0 |

(A)

(B)

(A) (B)

PATTERN PROCESSING SYSTEM

BACKGROUND OF THE INVENTION

This invention relates to a device for processing dot matrix patterns that represent various characters or the like for generating image data as a page to be printed by a page printer.

DESCRIPTION OF THE PRIOR ART

Although page printers have been developed which have a function for generating image data as a page to be printed by loading various patterns in any location in a buffer, it cannot be said that such printers have sufficient abilities in their speed and flexibility for processing the patterns.

A typical conventional page printer is disclosed, for example, in Belleson et al, U.S. Pat. No. 4,300,206, entitled "Flexible Text and Image Generator for a Raster Printer". Although it has such a function that generates a page image by selectively transferring various patterns in a raster memory to any location in a strip buffer under control of a microprocessor, it has such shortcomings that it fails to provide effective means to rotate the patterns. Of course, it can be arranged to previously store, in addition to original patterns, those rotated by predetermined angles in a pattern memory, which are selectively taken out if necessary. However, if Kanji patterns, which are of various types, are used in addition to alphanumerics, or if there are various pattern sizes, such a printer is unsuitable, because a pattern memory of a large capacity is required.

A conventional technique relating to the rotation of patterns is shown in Eiselen, U.S. Pat. No. 3,976,982, entitled "Apparatus for Image Manipulation". The image processor disclosed therein has a configuration to obtain in a memory the images that are original ones rotated in any angle by 90°. That is, the rotation of the images is attained by transferring the original ones bit by bit to the memory, and by appropriately selecting locations to be written with them. This technique has such shortcomings that its processing speed is low because the image is processed bit by bit.

Another example of conventional techniques relating to the pattern rotation is shown in Horiguchi et al, Japanese unexamined patent application No. 50-105334, published Aug. 20, 1975, application date Jan. 28, 1974, entitled "Character Pattern Generator". It performs the rotation of patterns, when it becomes required, by once writing patterns read from a pattern storage in a storage for changing orientation, then by reading them in a direction different from the writing direction. Therefore, it is obvious that it has relatively large numbers of hardware elements required to rotate the patterns, as well as needs longer time.

SUMMARY OF THE INVENTION

It is an object of this invention to devise a pattern processing device that can quickly process patterns with rotation by relatively small numbers of hardware elements. Such an object is realizable by a pattern processing device in which each pattern is separated into small segments called squares. Each square consists of n rows×n column bits (dots), wherein n is an integer larger than 1, and n=2 in a preferable embodiment. Various patterns are stored in a pattern storage so that they can be read by squares. Each square being read is transferred to a raster buffer through a rotating means, and loaded in a storage location that is specified by an addressing means. The rotating means has a function that gates a plurality of bits in each square to an output line in a different manner in response to control information relating to the pattern rotation. Further, the addressing means acts in combination with a reference address and offsets to sequentially specify a plurality of storage locations in the raster buffer in which a series of squares are stored.

Because this invention can attain the rotation of pattern by the action of the relatively simple rotating means and the addressing means, it has such advantages that the number of required hardware elements can be reduced, and that the transferring speed of patterns to the raster buffer is not affected by performance and nonperformance of rotating operation. Further, the pattern processing device according to the invention can cope with changes of pattern size to be handled without changing its overall configuration. That is, the change of pattern size requires only to determine the pattern to be integral multiples of square, and to change the type of offset used in the addressing means. The patterns to be handled are not restricted to characters and symbols, and may be patterns representing any image including, for example, an image of various ruler lines, etc.

DESCRIPTION OF THE PREFERRED EMBODIMENT

Figure 1:
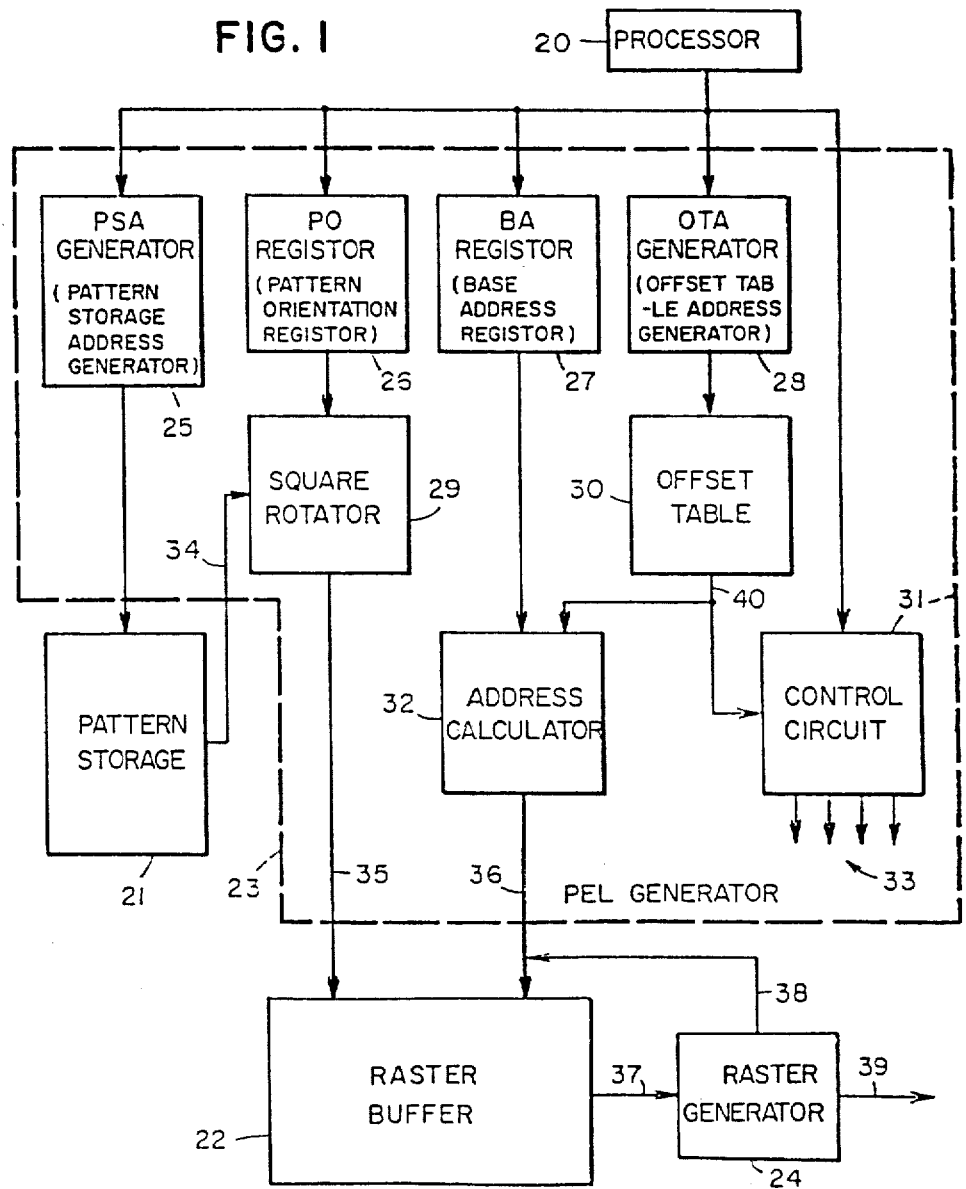
FIG. 1 shows a block diagram of a pattern processing device according to this invention.

FIG. 1 shows an arrangement of the pattern processor according to the invention. It comprises a pattern storage 21 storing patterns of various characters or the like, a raster buffer 22 for temporarily storing print data created by a plurality of selected patterns, and a pel generator 23 for controlling transfer of patterns from the pattern storage 21 to the raster buffer 22, and is controlled by a processor 20. The raster buffer 22 is further attached with a raster generator 24 that takes out the printing data in the buffer raster by raster, and transfers it to a printer (not shown).

Figures 2, 3, 4, 5:
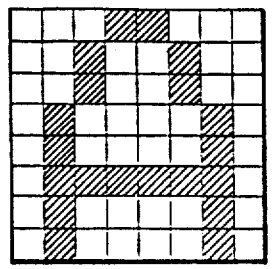
FIG. 2 shows an example of a dot matrix pattern.
FIG. 3 shows relations between the pattern and squares.
FIG. 4 shows bit numbers in one square.
FIG. 5 shows relations between addresses and the squares in a pattern storage.

Each pattern stored in the pattern storage 21 is partitioned by a unit of square consisting of n×n bits so as to facilitate rotation of the patterns. For example, it is assumed that each pattern consists of a dot matrix of 8 rows by 8 columns as shown in FIG. 2, and that one square consists of dots or bits of 2 rows by 2 columns, as shown in FIG. 4. Thus, each pattern consists of a square Sij of 4 rows by 4 columns as shown in FIG. 3. In FIG. 2, each of the partitions corresponds to one bit, wherein an empty partition corresponds to bit 0, a shaded one of bit 1. The pattern shown, for example, represents A of the alphabet. In addition, the numerals 0–3 in four partitions of one square in FIG. 4 represent the bit number in the square.

Four bits in each square are not stored as in a form of matrix, but are stored by arranging them in a single line in a sequence of the bit number 3, 2, 1, 0 in the square shown in FIG. 4, to facilitate reading the pattern square by square from the pattern storage 21. FIG. 5 shows the relation between the squares belonging to the pattern in FIG. 2 and the addresses of the pattern storage 21. While an example is shown wherein an address is assigned to every four bits of squares, it is possible to store two squares of even numbers and odd numbers as two half-bytes of a sequential storage location that is addressed byte by byte.

The pel generator 23 comprises various components contained in the block encircled by the broken lines in FIG. 1. A control circuit 31 decodes commands from the processor 20, and controls the operation timing of other components by controlling or timing signals on lines 33. The connection between the lines 33 and other components is omitted, because it should be easily understood by those skilled in the art. Whenever it becomes required to transfer one pattern from the pattern storage 21 to the raster buffer 22, information required for such operation is loaded from the processor 20 to a pattern storage address (PSA) generator 25, a pattern orientation (PO) register 26, a base address (BA) register 27, and an offset table address (OTA) generator 28.

The PSA generator 25 is loaded with an address specifying a storage location in the pattern storage 21 that stores the first square of the pattern to be read. The generator 25 sequentially specifies storage locations for subsequent squares by increasing the address under the control of the control circuit 31. Each square being read from the specified storage location is transferred to the raster buffer 22 through a line 34, a square rotator 29 and a line 35. The lines 34 and 35 actually consist of four lines respectively to transfer four bits of the square in parallel.

Figure 6:
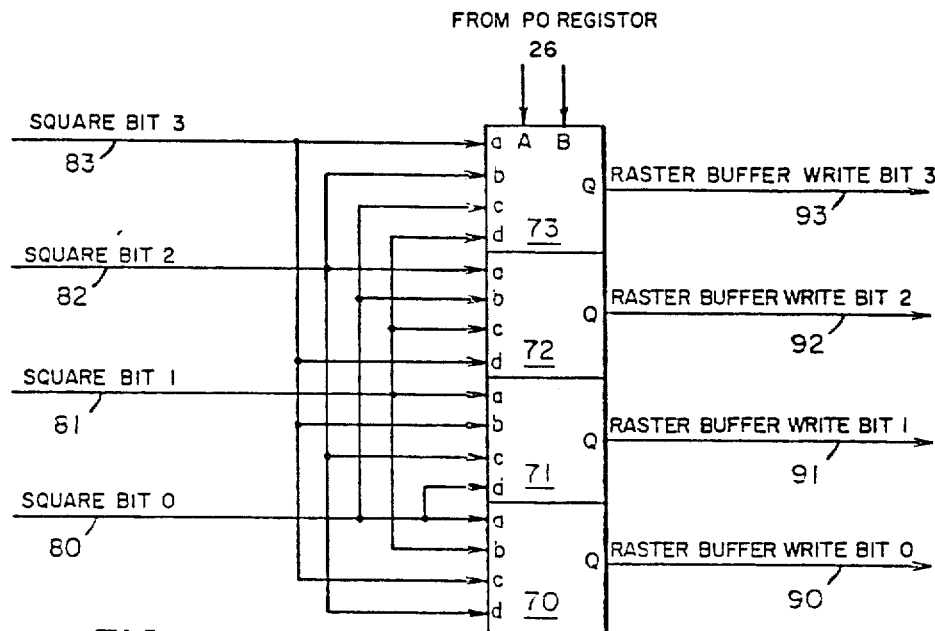
FIG. 6 shows a detailed configuration of a square rotator.

The operation of the square rotator 29 is controlled by the pattern orientation information being loaded in the PO register 26. That is, this information indicates that a pattern, consequently individual squares belonging to it, should be rotated according to one of predetermined rotating angles. The selectable rotating angles are, for example, 0° (no rotation), 90°, 180°, and 270° in the counterclockwise rotation. FIG. 6 shows a detailed configuration of the square rotator 29 to perform such rotating operation.

In FIG. 6, input lines 80, 81, 82, and 83 correspond to the line 34 in FIG. 1 and transmit the bits of the bit number 0, 1, 2, and 3 in the square, respectively. On the other hand, output lines 90, 91, 92, and 93 correspond to the line 35 in FIG. 1 and respectively transfer bits to be written, as the bit number 0, 1, 2, and 3 in the square, in one square storage location in the raster buffer 22. The square rotator 29 contains a group of data selectors (gates). As shown, all input lines 80–83 are connected to each data selector. Each data selector has a function gating the bit from either one of four input lines to the output line according to the orientation information from the PO register 26. For example, the orientation information may be of two bits, and specify 0°, 90°, 180°, and 270° by 00, 01, 10, and 11. All of the data selectors 70–73 select the bit on the input line related to either one of a, b, c, or d according to the orientation information of either one of 00, 01, 10, or 11 all at once, and send it out to the output lines. Thus, the rotation of each square is attained.

Figure 7:
FIG. 7 shows manners of rotation of the squares according to the configuration of FIG. 6.

As an example, FIG. 7(B) shows a relation between the rotation angles and four bits on the output lines when the square shown at (A) is processed by the square rotator in FIG. 6, and appearances of the square after processing.

Figure 8:
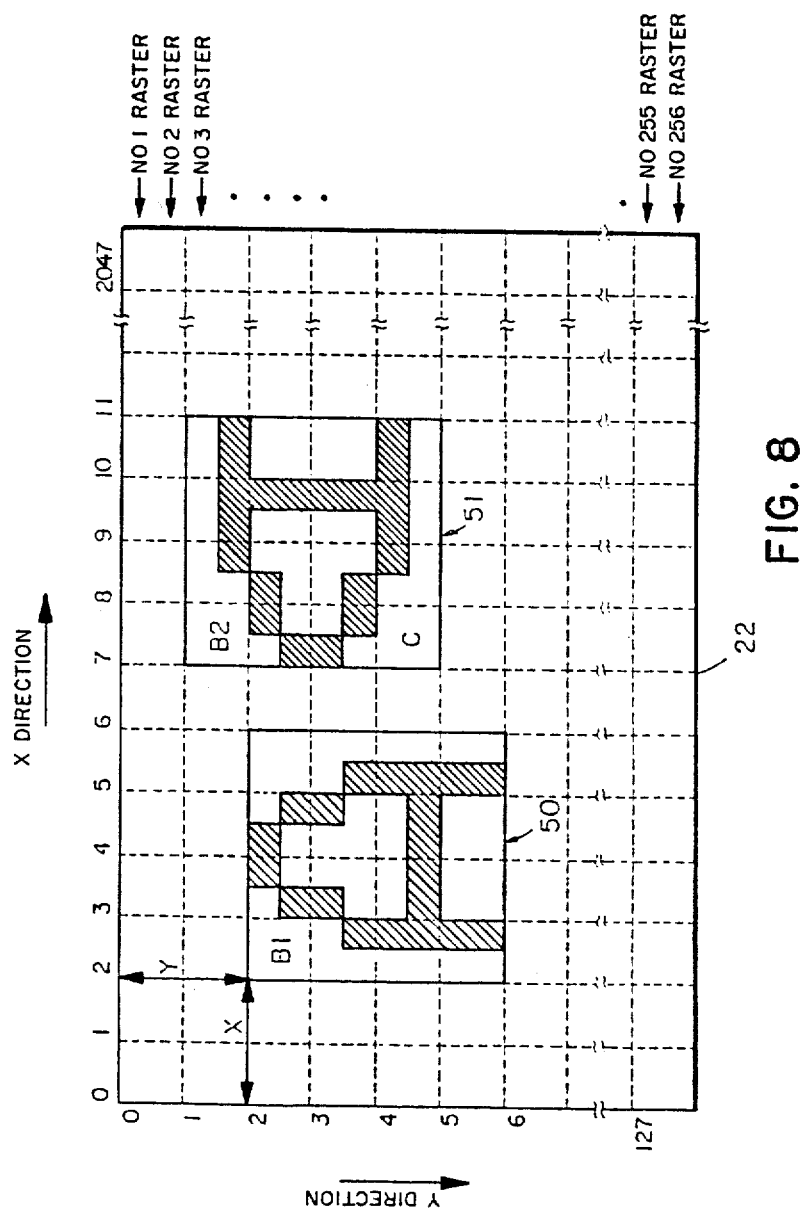
FIG. 8 shows relations between a raster buffer and the pattern to be written therein.

Now, FIG. 8 is referred to explain the operation for writing squares successively appearing on the output of the square rotator 29 into the raster buffer 22. It schematically shows a relation between the raster buffer 22 partitioned so that the address can be assigned to each square and the patterns stored therein. A partition defined by the broken lines is a storage location for storing a square, which consists of 2×2 bit positions. In this example, the raster buffer 22 is constituted to have a capacity of 2,048 squares (4,096 bits) in X-direction and 128 squares (256 bits) in Y-direction. That is, it has a capacity of 128K bytes. Usually, such capacity is not sufficient to contain the printing data for one page to be printed at a time, which may be overcome by partitioning the page into a plurality of sections, so that the buffer can successively contain the printing data for each section. It may also be possible to continuously process successive sections by utilizing an addressing technique of the wrap-around type. Of course, it may be possible to employ a buffer having a capacity enough to contain the printing data for one page at a time. The width of the raster buffer in X-direction corresponds to the printable width in a direction normal to the feeding direction of the paper.

Figures 9, 10:
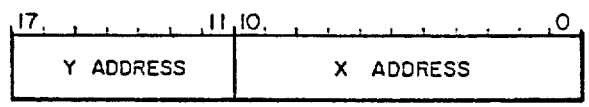
FIG. 9 shows a format of addresses relating to the raster buffer.
FIG. 10 shows contents of offset tables that are used for writing the pattern rotated by 0° (non-rotation) and 90° in the raster buffer.

An address is assigned to each square storage location, which address, as shown in FIG. 9, consists of an X-direction address of 11 bits indicating the position in that direction, and a Y-direction address of 7 bits indicating the position in that direction.

The square storage locations that are sequentially written with a plurality of squares belonging to a certain pattern being transferred through the square rotator 29 are specified by addresses that are generated by the operation of the BA register 27, the OTA generator 28, the offset table 30, and the address calculator 32 in the pel generator 23 of FIG. 1. The BA register 27 is loaded with a base address that specifies a location to be a reference of the square storage locations in which the squares belonging to one pattern are written. Then, addresses for sequentially specifying these square storage locations are generated by adding a series of offsets (ΔX, ΔY) representing subsequent displacement to the base address (X, Y) from the BA register 27. A series of offsets are sequentially supplied from the offset table 30 through the line 40 under the control of the OTA generator 28, the addition to the base address being performed by the address calculator 32. The addresses generated are used to specify the square storage locations of the raster buffer 22 through the line 36.

The square storage location specified by the base address is that indicated by B1 and B2 in FIG. 8. That is, it is arranged that, regardless of the rotation of the pattern received, the one at the upper left corner of a group of square storage locations for receiving the pattern is specified by the base address. In other words, the base address is the smallest one of addresses for the group of square storage locations (except when using the addressing technique of the wrap-around type).

Thus, a series of offsets supplied from the offset table are required to be different according to the rotation angle of the pattern, because the base address is determined as mentioned above, and because the squares of any pattern from the pattern storage are always read in a predetermined sequence. For example, the first square of the non-rotated pattern 50 shown in FIG. 8 is written in the storage location indicated by B1, while that of the 90° rotated pattern 51 must be written in the location indicated by C, instead of in the location indicated by B2. Therefore, in this example, the offset table 30 contains four tables or areas that includes four groups of offsets relating to the rotation of 0°, 90°, 180°, and 270°, respectively. Also, in the example, while it is assumed that the pattern has only one size, when patterns with different sizes are used, it becomes required to prepare different offset data for each size.

FIGS. 10(A) and 10(B) respectively show the contents of two tables or areas in the offset table 30 that are used to rotate a pattern consisting of 4×4 squares by 0° (no rotation) and 90°. Binary values in $\Delta X$ and $\Delta Y$ columns represent offsets in X- and Y-directions. The first line of each table is specified by an offset table entry address that is first loaded in the OTA generator 28. Under timing control by the control circuit 31, the OTA generator 28 operates to read the contents of successive lines of the offset table to the line 40 by increasing the addresses relating to the table in synchronization with reading of successive squares from the pattern storage 21. Each line of the offset table also stores an end square bit (ESB) that becomes 1 only at the end of a series of offsets used in relation to a pattern, and that is read together with the offset. The control circuit 31 detects that transfer of all squares belonging to one pattern is completed, by detecting that ESB is 1, and generates an interruption signal so as to inform the processor 20 that the next pattern can be processed.

As an example, writing the pattern 51 in FIG. 8 is studied by referring to the table in FIG. 10(B). The first square is written in the storage location C displaced by Y-direction by three squares indicated by $\Delta Y=11$ from the reference location B2. It is recognized that the next square is written in the storage location displaced to Y-direction by two squares indicated by $\Delta Y=10$ from the reference location B2. Similarly, other squares are sequentially written in locations determined according to $\Delta Y$ and $\Delta X$.

The printing data thus generated in the raster buffer 22 by the operation of the pel generator 23 is transferred raster by raster to the printer by the operation of the raster generator 24 through the line 39. That is, it is designed to transfer the content of the raster buffer 22 bit line by bit line (one bit in width in Y-direction, and 2,048 bits in length in X-direction) with the representation of first to 256th raster shown in the right of FIG. 8. However, since the access is performed in the unit of square, when the raster generator 24 sequentially transfers a pair of rasters, for example the first and the second raster, it accesses same square line twice, takes it out through the line 37, and transfers only the upper bits 3 and 2 of each square in the first time, and only the lower bits 1 and 0 in the second time. The raster generator 24 performs such access operation by the address that is supplied on the line 38 by it.

Finally, the raster buffer 22 is described for its actual configuration. Four bit positions forming each square storage location are not arranged in a matrix of 2 rows by 2 columns, but actually arranged in a line to form a storage location of 4-bit width. Also, a plurality of storage locations is not required as a whole to be arranged in a matrix of X- and Y-directions as shown in FIG. 8, but accepted only if they are arranged in a sequence of physical addresses of 00000 to 3FFFF that are obtained by representing 18 bits of the format address shown in FIG. 9 in the hexadecimal notation. In this sense, it can be said that FIG. 8 shows the overall arrangement of a plurality of storages, and the arrangement of a 4-bit location in each storage by rearranging them for easy understanding of the relation with the pattern to be written.

As above, while the invention is described for its preferred embodiment, it is not restricted in such embodiment, but can be embodied in various manners. For example, the pattern used may be of larger size, and the square may be larger than 2×2 bits in the relation to the pattern size. It is preferred to use a random access memory for the offset table 30 because it easily copies with the change of the pattern size, but of course a read only memory may be used. This invention allows relatively small amounts of hardwares to quickly process patterns that required to be rotated in connection with the generation of the printing data for the page printer.

We claim:
1. A pattern processing system comprising:
   a pattern storage for storing plural dot matrix patterns representing various characters, etc., each pattern comprising plural squares each of which consists of n×n bits (n is integer larger than 1);
   a read-out means for successively reading out plural squares of any one of patterns from said pattern storage;
   a register for storing control information indicating one of plural predetermined rotation angles for the pattern read out from said pattern storage;
   a rotation means for receiving parallel n×n bits of each square read out by said read-out means via plural input lines and for gating said parallel n×n bits onto plural output lines in a fashion which is changed according to the control information in said register, thereby rotating each square by the indicated angle;
   a raster buffer having plural addressable storage locations each of which comprises n×n bit positions for receiving and storing the n×n bits of each square from the output lines of said rotation means;
   an address means associated with said raster buffer for designating any one of storage locations to receive each square from the output lines of said rotation means, said address means including means for holding a base address to indicate a basic one of plural storage locations which are to store plural squares of one pattern and means for successively generating offsets to indicate displacements from said base address for plural storage locations to receive said plural squares locations are designated by the combination of said base address and said offsets; and
   a control means for controlling said read-out means, register and address means.

* * * * *